(12) United States Patent
Takagi

(10) Patent No.: US 12,194,788 B2
(45) Date of Patent: Jan. 14, 2025

(54) TIRE

(71) Applicant: Toyo Tire Corporation, Itami (JP)

(72) Inventor: Yuki Takagi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/728,343

(22) Filed: Apr. 25, 2022

(65) Prior Publication Data

US 2022/0242174 A1     Aug. 4, 2022

Related U.S. Application Data

(63) Continuation of application No. 16/589,406, filed on Oct. 1, 2019, now abandoned.

(30) Foreign Application Priority Data

Oct. 3, 2018   (JP) .................................. 2018-188126

(51) Int. Cl.
| | | |
|---|---|---|
| B60C 19/00 | (2006.01) | |
| B29D 30/00 | (2006.01) | |
| B60C 23/04 | (2006.01) | |

(52) U.S. Cl.
CPC .......... B60C 23/04 (2013.01); B29D 30/0061 (2013.01); *B29D 2030/0077* (2013.01); *B60C 2019/004* (2013.01)

(58) Field of Classification Search
CPC ... B60C 19/00; B60C 2019/004; B60C 23/04; B60C 15/0036; B60C 2015/009
See application file for complete search history.

(56) References Cited

U.S. PATENT DOCUMENTS

| | | | |
|---|---|---|---|
| 4,911,217 A | 3/1990 | Dunn et al. | |
| 6,255,379 B1* | 7/2001 | Hahn | ..................... C08K 5/548 |
| | | | 524/495 |
| 2003/0089440 A1* | 5/2003 | Ueyoko | ................. B60C 5/142 |
| | | | 152/554 |
| 2005/0110277 A1 | 5/2005 | Adamson et al. | |
| 2006/0213597 A1* | 9/2006 | Takimura | ............. B60C 9/0042 |
| | | | 152/526 |
| 2007/0179267 A1* | 8/2007 | Suzuki | ..................... C08L 9/00 |
| | | | 526/170 |
| 2007/0251619 A1 | 11/2007 | Bertrand | |

(Continued)

FOREIGN PATENT DOCUMENTS

| | | |
|---|---|---|
| CN | 101734112 A | 6/2010 |
| CN | 106794648 A | 5/2017 |

(Continued)

OTHER PUBLICATIONS

Machine Translation: KR-2007022930-A, Han S C, (Year: 2022).*

(Continued)

*Primary Examiner* — Kendra Ly
(74) *Attorney, Agent, or Firm* — Maier & Maier, PLLC

(57) ABSTRACT

A tire includes tread having at least one ring-shaped steel belt extending in a circumferential direction of the tire, and a pair of beads having bead filler extending to an outer side of a tire-radial direction of the bead core, in which an electronic component is embedded in a region between a tire-radial direction outside end of the bead filler and a tire-width direction outside end of the steel belt.

7 Claims, 11 Drawing Sheets

(56) References Cited

U.S. PATENT DOCUMENTS

| | | | |
|---|---|---|---|
| 2008/0289736 A1* | 11/2008 | Adamson | B60C 23/0493 |
| | | | 156/110.1 |
| 2009/0015415 A1 | 1/2009 | Uehara et al. | |
| 2009/0188601 A1* | 7/2009 | Kuniyasu | B60C 15/0018 |
| | | | 152/541 |
| 2010/0122757 A1 | 5/2010 | Lionetti et al. | |
| 2010/0123584 A1 | 5/2010 | Lionetti et al. | |
| 2011/0259497 A1 | 10/2011 | Borot et al. | |
| 2012/0305151 A1 | 12/2012 | Robert | |
| 2014/0333492 A1 | 11/2014 | Battocchio | |
| 2016/0107490 A1* | 4/2016 | Randall | B29D 30/0061 |
| | | | 156/131 |
| 2016/0200142 A1* | 7/2016 | Tomita | B60C 9/02 |
| | | | 152/526 |
| 2016/0311259 A1* | 10/2016 | Shimizu | B29D 30/0681 |
| 2017/0225524 A1 | 8/2017 | Tamura | |
| 2017/0358839 A1 | 12/2017 | Wu et al. | |
| 2019/0135051 A1* | 5/2019 | Tomita | B29D 30/0606 |
| 2019/0300680 A1* | 10/2019 | Cho | B60C 19/00 |
| 2019/0322142 A1* | 10/2019 | Lallement | B60C 17/0009 |
| 2020/0079159 A1 | 3/2020 | Destraves et al. | |
| 2021/0237521 A1* | 8/2021 | Pedrinelli | B29D 30/0061 |
| 2021/0237522 A1 | 8/2021 | Pedrinelli et al. | |

FOREIGN PATENT DOCUMENTS

| | | | | |
|---|---|---|---|---|
| CN | 106794721 A | | 5/2017 | |
| EP | 0 505 905 A1 | | 9/1992 | |
| EP | 3 196 056 A1 | | 7/2017 | |
| FR | 3 059 605 A1 | | 6/2018 | |
| JP | 2006-151372 A | | 6/2006 | |
| JP | 2006321448 A | * | 11/2006 | |
| JP | 2016-037236 A | | 3/2016 | |
| JP | 2017132292 A | | 8/2017 | |
| JP | 2017-537013 A | | 12/2017 | |
| KR | 10-2007-0022930 A | | 2/2007 | |
| KR | 2007022930 A | * | 2/2007 | B60C 1/0025 |
| KR | 20080039715 A | | 5/2008 | |
| KR | 10-2010-0082464 A | | 7/2010 | |
| KR | 20100120505 A | | 11/2010 | |
| KR | 10-2013-0067944 A | | 6/2013 | |
| WO | 2016/060851 A1 | | 4/2016 | |

OTHER PUBLICATIONS

Machine Translation: JP-2006321448-A, Sawano S, (Year: 2023).*
Machine Translation: KR-2007022930-A, Han S C, (Year: 2024).*
Notice of Reasons for Rejection issued on Jun. 4, 2019 in corresponding Japanese application No. 2018-188126; 5 pages.
Decision to Grant issued on Aug. 27, 2019 in corresponding Japanese application No. 2018-188126; 8 pages.
Extended European Search Report issued on Feb. 3, 2020, in connection with corresponding EP Application No. 19200354.9 (8 pgs.).
Tang Lunyu "Principles and Technology of Tire Refurbishment." University of Electronics Science and Technology Press, Apr. 1991, 1st Ed. 3 pages. Machine-generated English Abstract provided.
Chinese Office Action issued on Jun. 23, 2021, in connection with corresponding CN Application No. 201910915309.6 (19 pp., including machine-generated English translation).

* cited by examiner

TIRE

CROSS-REFERENCE TO RELATED APPLICATIONS

This application is based on and claims the benefit of priority from Japanese Patent Application No. 2018-188126, filed on 3 Oct. 2018, the content of which is incorporated herein by reference.

FIELD

The present invention relates to a tire into which an electronic component is embedded.

BACKGROUND

Conventionally, a tire embedding an electronic component such as an RFID tag has been known. With such a tire, it is possible to carry out production management of the tire, usage history management, etc. by the RFID tag embedded in the tire and a reader as external equipment carrying out communication. For example, Japanese Unexamined Patent Application, Publication No. 2016-37236 discloses a tire embedding an RF tag in the vicinity of a stiffener.

SUMMARY

According to the technology illustrated in Japanese Unexamined Patent Application, Publication No. 2016-37236, it is possible to carry out production management, shipping management, usage history management, etc. of tires. However, with the technology illustrated in Patent Document 1, the RF tag is arranged in the vicinity of a stiffener adjacent to a metal bead core. Consequently, with an electronic device such as the RF tag having a communication function, there is a possibility of the communication state thereof being affected by the metal bead core and becoming unstable. In other words, there is a possibility of the electronic device no longer being able to exhibit the original function thereof.

The present invention has been made taking account of the above-mentioned problem, and an object thereof is to provide a tire which can maintain the performance of the electronic component, by arranging the electronic device at a position distanced from metal components.

A tire according to a first aspect of the present invention includes: tread having at least one ring-shaped steel belt which extends in a circumferential direction of the tire; and a pair of beads having a bead filler which extends to an outer side in a tire-radial direction of the bead core, in which an electronic component is embedded in a region between a tire-radial direction outside end of the bead filler and a tire-width direction outside end of the steel belt.

According to a second aspect of the present invention, the tire as described in the first aspect may further include: a cap ply at an outer side in the tire-radial direction of the steel belt, in which a tire-width direction outside end of the cap ply may extend more to an outer side in the tire-width direction than the tire-width direction outside end of the steel belt; and the electronic component may be embedded in a region between the tire-radial direction outside end of the bead filler and the tire-width direction outside end of the cap ply.

According to a third aspect of the present invention, the tire as described in the first aspect may further include: a side wall which extends between the bead and the tread, in which the electronic component may be embedded in a region between a tire-widest part vicinity of the side wall and the tire-radial direction outside end of the bead filler.

According to a fourth aspect of the present invention, in the tire as described in the third aspect, the electronic component may be embedded in the tire-widest part vicinity of the side wall.

According to a fifth aspect of the present invention, the tire as described in the third or fourth aspect may further include: a carcass ply which extends from one bead core to another bead core, in which the carcass ply may have an overlapped region at the side wall, and the electronic component may be arranged between the carcass ply that is overlapped.

According to a sixth aspect of the present invention, in the tire as described in the fifth aspect, the carcass ply that is overlapped may be formed by a ply body extending from the one bead core to the other bead core, and a ply folding part that is folded back around the bead core and is overlapped with the ply body.

According to a seventh aspect of the present invention, the tire as described in any one of the first to fourth aspects may further include: a carcass ply which is at least one layer extending from one bead core to another bead core; and an inner liner provided to a tire inner cavity side of the carcass ply, in which the electronic component may be arranged between the carcass ply and the inner liner.

According to an eighth aspect of the present invention, the tire as described in any one of the first to fourth aspects may further include: a carcass ply which is at least one layer extending from one bead core to another bead core; and side wall rubber provided to an outer side in the tire-width direction of the carcass ply, the electronic component may be arranged between the carcass ply and the side wall rubber.

According to a ninth aspect of the present invention, in the tire as described in any one of the first to eighth aspects, at least one rubber sheet covering at least part of the electronic component may be provided at a periphery of the electric component.

According to a tenth aspect of the present invention, the tire as described in the ninth aspect may further include: a carcass ply which is at least one layer extending from one bead core to another bead core; and side wall rubber provided to an outer side in the tire-width direction of the carcass ply, in which the rubber sheet may be configured from rubber of higher modulus than the side wall rubber, or a short-fiber filler mixed rubber.

According to an eleventh aspect of the present invention, the tire as described in the ninth aspect may further include: a carcass ply which is at least one layer extending from one bead core to another bead core; an inner liner provided to an inner side in the tire-width direction of the carcass ply; and side wall rubber provided to an outer side in the tire-width direction of the carcass ply, in which the rubber sheet may be configured from rubber of higher modulus than the side wall rubber or the inner liner, and lower modulus than coating rubber of the carcass ply.

According to the present invention, it is possible to provide a tire which can maintain the performance of the electronic component, by arranging the electronic device at a position distanced from metal components.

DETAILED DESCRIPTION

First Embodiment

Figure 1:
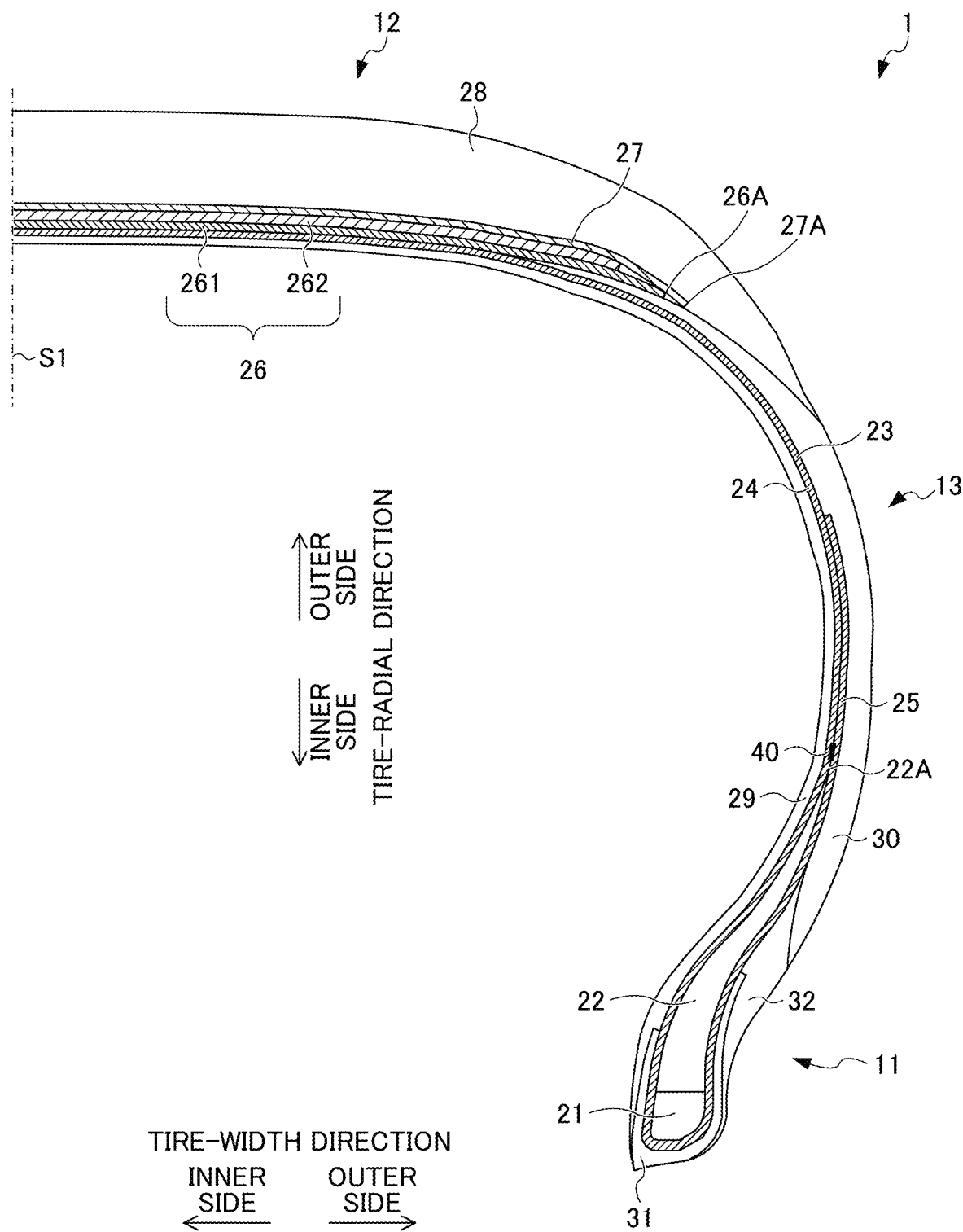
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer side of tire-radial direction is a direction distancing from the tire rotation axis, and is the upper side of the paper plane in FIG. 1. Inner side of tire-radial direction is a direction approaching the tire rotation axis, and is the lower side of the paper plane in FIG. 1. The same also applies to FIGS. 2 to 8.

The tire 1 is a tire for passenger cars, for example, and includes a pair of beads 11 provided at both sides in the tire-width direction, a tread 12 forming the contact patch with the road surface, and a pair of side walls 13 extending between the pair of beads 11 and the tread 12.

The bead 11 includes an annular bead core 21 formed by wrapping around several times bead wires made of metal coated with rubber, and a bead filler 22 of tapered tip shape extending to the outer side in the tire-radial direction of the bead core 21. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability, and is configured from rubber of a higher modulus than the surrounding rubber members, for example.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. In the present embodiment, the ply folding part 25 is overlapped with the ply body 24. The carcass ply 23 is configured by a plurality of ply cords extending in the tire-width direction. In addition, a plurality of ply cords is arranged side by side in a tire circumferential direction. This ply cord is configured by an insulated organic fiber cord such as polyester or polyamide, or the like, and is covered by rubber.

In the tread 12, at least one ring-shaped steel belt 26 which extends in a circumferential direction of the tire is provided in the outer side in the tire-radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although two layers of steel belts 261, 262 are provided, the number of layered steel belts 26 is not limited thereto.

At the outer side in the tire-radial direction of the steel belt 26, a cap ply 27 serving as a belt reinforcement layer is provided. The cap ply 27 is configured from an insulating organic fiber layer such as of polyamide fibers, and is covered by rubber. By providing the cap ply 27, it is possible to achieve an improvement in durability and a reduction in road noise while travelling.

The tread rubber 28 is provided at the outer side in the tire-radial direction of the cap ply 27. A tread pattern (not illustrated) is provided to the outer surface of the tread rubber 28, and this outer surface serves as a contact patch which contacts with the road surface.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

A chafer 31 is provided on the inner side in the tire-radial direction of the carcass ply 23 provided around the bead core 21 of the bead 11. The chafer 31 also extends to the outer side in the tire-width direction of the ply folding part 25 of the carcass ply 23, and rim strip rubber 32 is provided at the outer side in the tire-width direction thereof and the inner side in the tire-radial direction. The outer side in the tire-width direction of this rim strip rubber 32 connects with the side wall rubber 30.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. In a storage part inside the RFID chip, identification information such as a manufacturing number and part number is stored.

As shown in FIG. 1, the RFID tag 40 is embedded in a region between the tire-radial direction outside end 22A of the bead filler 22 and the tire-width direction outside end 26A of the steel belt 26. In other words, the RFID tag 40 is arranged at a position sufficiently distanced from metal bead core 21, which has a possibility of adversely affecting communication. Herein, the bead core 21 is formed in a ring shape by winding in layers of metal bead wires, and thus is a metal member having a particularly high possibility of adversely affecting communication.

In addition, the RFID tag 40 is arranged to be separated so as not to contact with the steel belt 26. Consequently, no communication disturbance will occur by the antenna length substantially changing due to contact between the antenna of the RFID tag 40 and the steel belt 26. It should be noted that the antenna length of the RFID tag 40 is optimized according to the frequency band, etc. of the radio waves to be used, and if the antenna length changes by contact with a metal member, communication disturbance will occur.

Herein, adding to the present embodiment, the cap ply 27 extends more to the outside in the tire-width direction than the steel belt 26. Then, the RFID tag 40 is provided in a region between the tire-radial direction outside end 22A of the bead filler 22, and the tire-width direction outside end 27A of the cap ply 27. According to this configuration, the RFID tag 40 is reliably prevented from contacting with the steel belt 26.

Further adding to the present embodiment, the RFID tag 40 is embedded in a region between the tire-radial direction outside end 22A of the bead filler 22 and a tire-widest part vicinity A of the side wall 13. In other words, the RFID tag 40 is arranged at a position far from the metal bead core 21, and also far from the steel belt 26, and thus the possibility of the RFID tag 40 being adversely affected by metal components is low.

Herein, tire-widest part refers to the widest position in the tire-width direction cross section, when assembling the tire to a normal rim, filling with normal internal pressure and establishing an unloaded state not applying load. Then, tire-widest part vicinity A indicates within a range of 20% the cross-sectional height centered around the widest position, i.e. within a range of a position of 10% the cross-sectional height to the tire-radial direction outer side and position of 10% the cross-sectional height to the tire-radial direction inner side, centered around the widest position. Herein, cross-sectional height is a numerical value decided by the tire size, for example, in the case of a tire of size 195/65 R15, "cross-sectional height=called width×ellipticity=195×0.65=126.75 mm".

Figure 2:
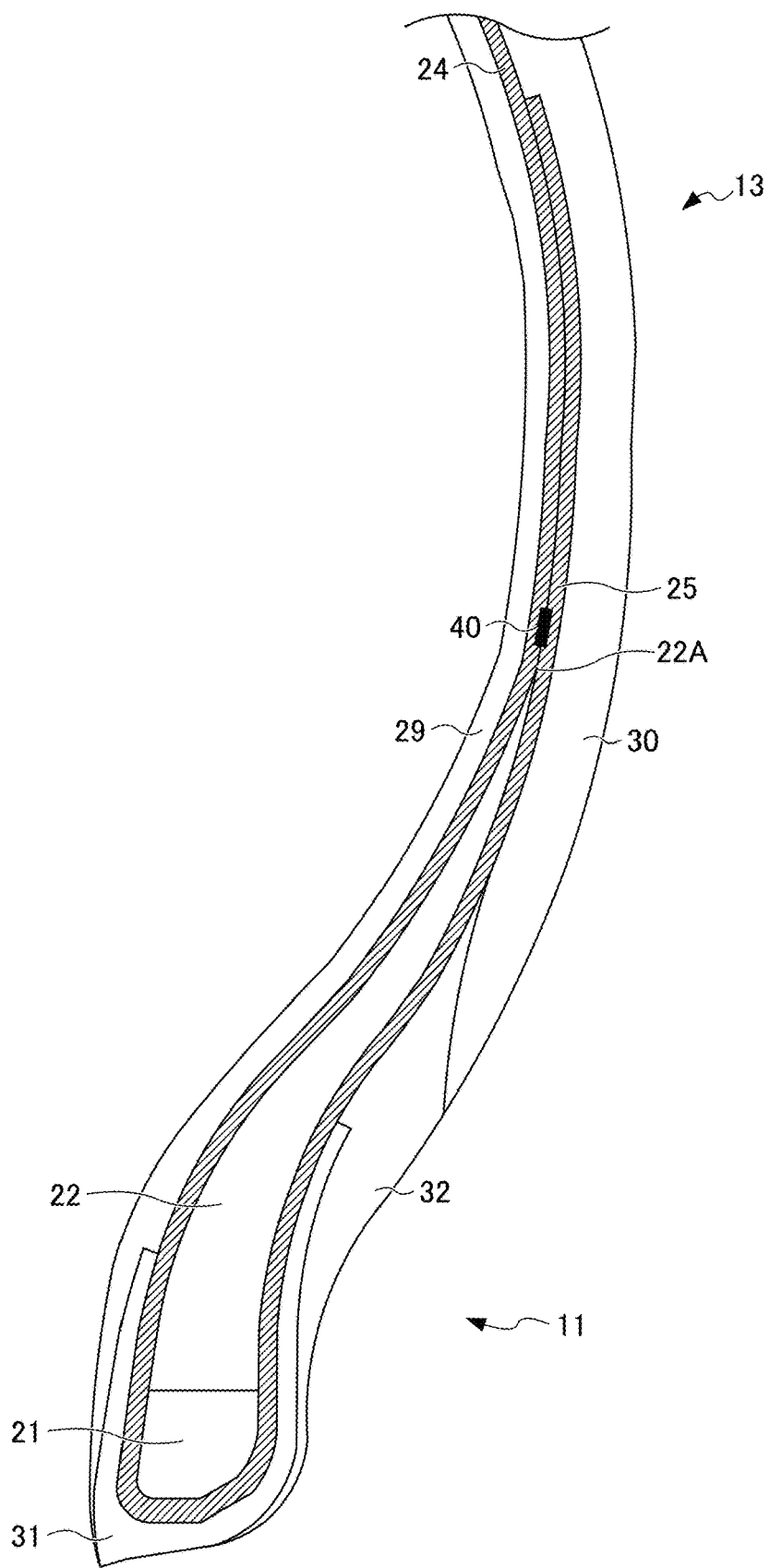
FIG. 2 is a partially enlarged view of a tire according to the first embodiment of the present invention.

FIG. 2 is an enlarged cross-sectional view showing around the embedded part of the RFID tag 40. As shown in FIG. 2, in the present embodiment, the RFID tag 40 is arranged in a state sandwiched between the ply body 24 and ply folding part 25.

Since the RFID tag 40 is sandwiched between the ply body and ply folding part 25, it is possible to prevent a situation during vulcanization or during use where the antenna of the RFID tag 40 pushes the side wall rubber 30 and/or inner liner 29 which are the rubber structure of the tire 1, and stress concentrates on this portion. In addition, it is possible to prevent stress concentration between the antenna of the RFID tag 40 and the side wall rubber 30 and/or inner liner 29, which are the rubber structure of the tire 1, without using additional members.

Herein, the RFID tag 40 is mounted before the vulcanization process in the manufacturing process of tires. In the present embodiment, the RFID tag 40 is mounted to the ply body 24 or ply folding part 25 of the carcass ply 23 prior to the coating rubber being vulcanized. At this time, since the coating rubber of the carcass ply 23 is in a state of raw rubber prior to vulcanization, it is possible to paste the RFID tag 40 to the carcass ply 23 employing the adhesiveness thereof. Alternatively, it may be pasted using an adhesive or the like. After pasting the RFID tag 40, by overlapping the ply body 24 and ply folding part 25, the RFID tag 40 is interposed by the carcass ply 23. Subsequently, the green tire in which the respective constituent members including the RFID tag 40 are assembled is vulcanized in a vulcanization step to manufacture the tire. In this way, in the present embodiment, since it is possible to paste the RFID tag 40 to the carcass ply 23 covered by the raw rubber having rigidity and having adhesiveness during tire manufacture, the assembly work of the RFID tag 40 in the manufacturing process of the tire is easy.

It should be noted that the RFID tag 40 embedded in the tire, when including an antenna, often has a longitudinal direction, as shown as the RFID tag 40 in FIG. 9 described later. It is preferable for such an RFID tag 40 to be embedded in the tire 1, so that the longitudinal direction thereof is a direction of the tangential line to the circumferential direction of the tire, i.e. direction orthogonal to the paper plane in the cross-sectional views of FIGS. 1 and 2. By embedding in this way, stress is hardly applied to the RFID tag 40, when the tire deforms.

It should be noted that the RFID tag 40 may be interposed between the ply body 24 and ply folding part 25 in a state covered by a protective member of rubber or the like; however, it may be interposed directly by the ply body 24 and ply folding part 25 without covering by the protective member.

It should be noted that, in the present embodiment, the RFID tag 40 is arranged in a state interposed by the ply body and ply folding part 25; however, in a case of the ply being configured by a plurality of plies, for example, case of configuring by an up ply (inside carcass ply) and down ply (outside carcass ply), the RFID tag 40 may be arranged in a state interposed between the up ply and down ply, for example.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. Consequently, even in the case of embedding various electronic components in a tire, it is possible to obtain the effects of the present invention. For example, the electronic component may be a piezoelectric element or strain sensor.

Figure 3:
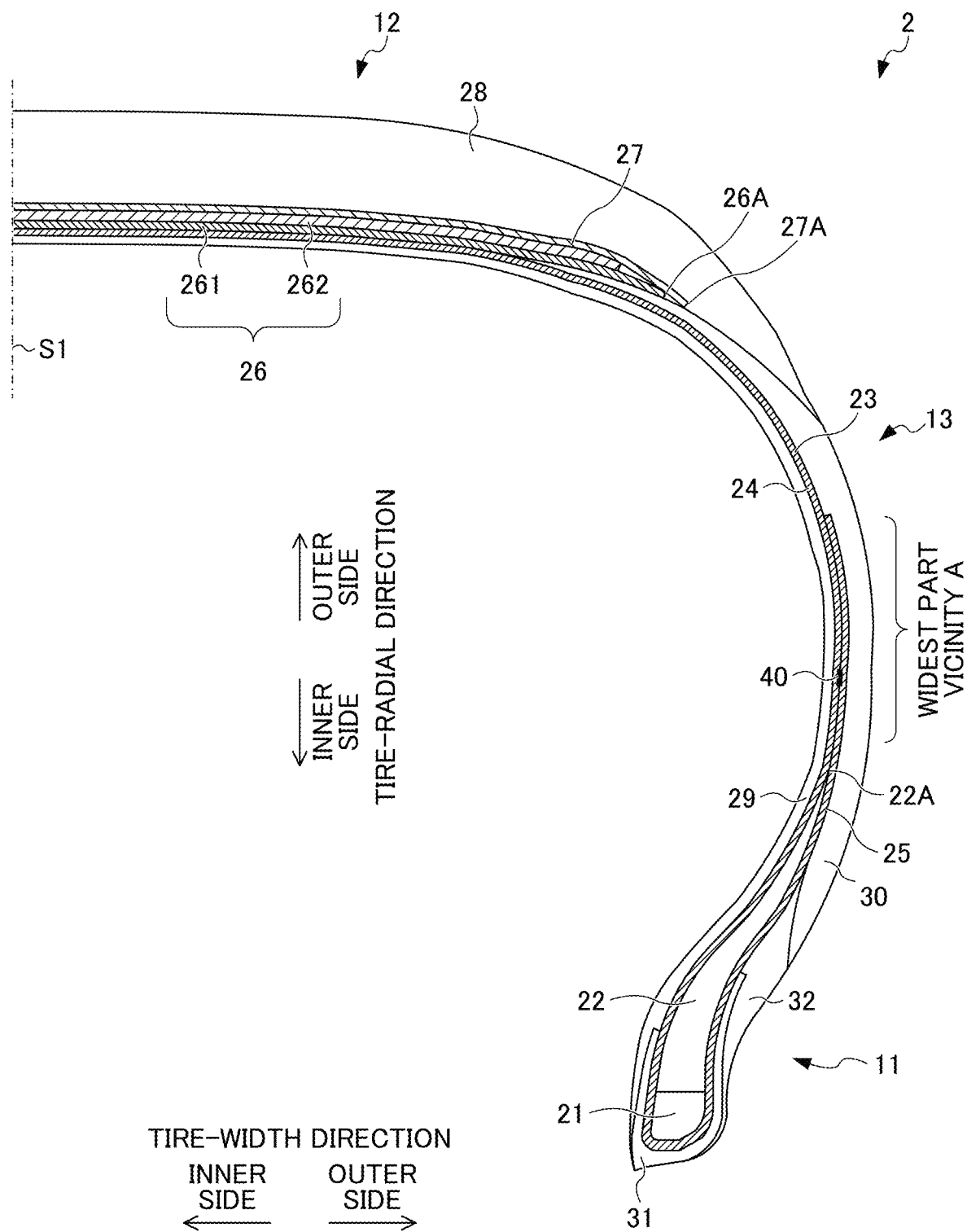
FIG. 3 is a view showing a half section in a tire-width direction of a tire according to a modified example of the first embodiment of the present invention.
Figure 4:
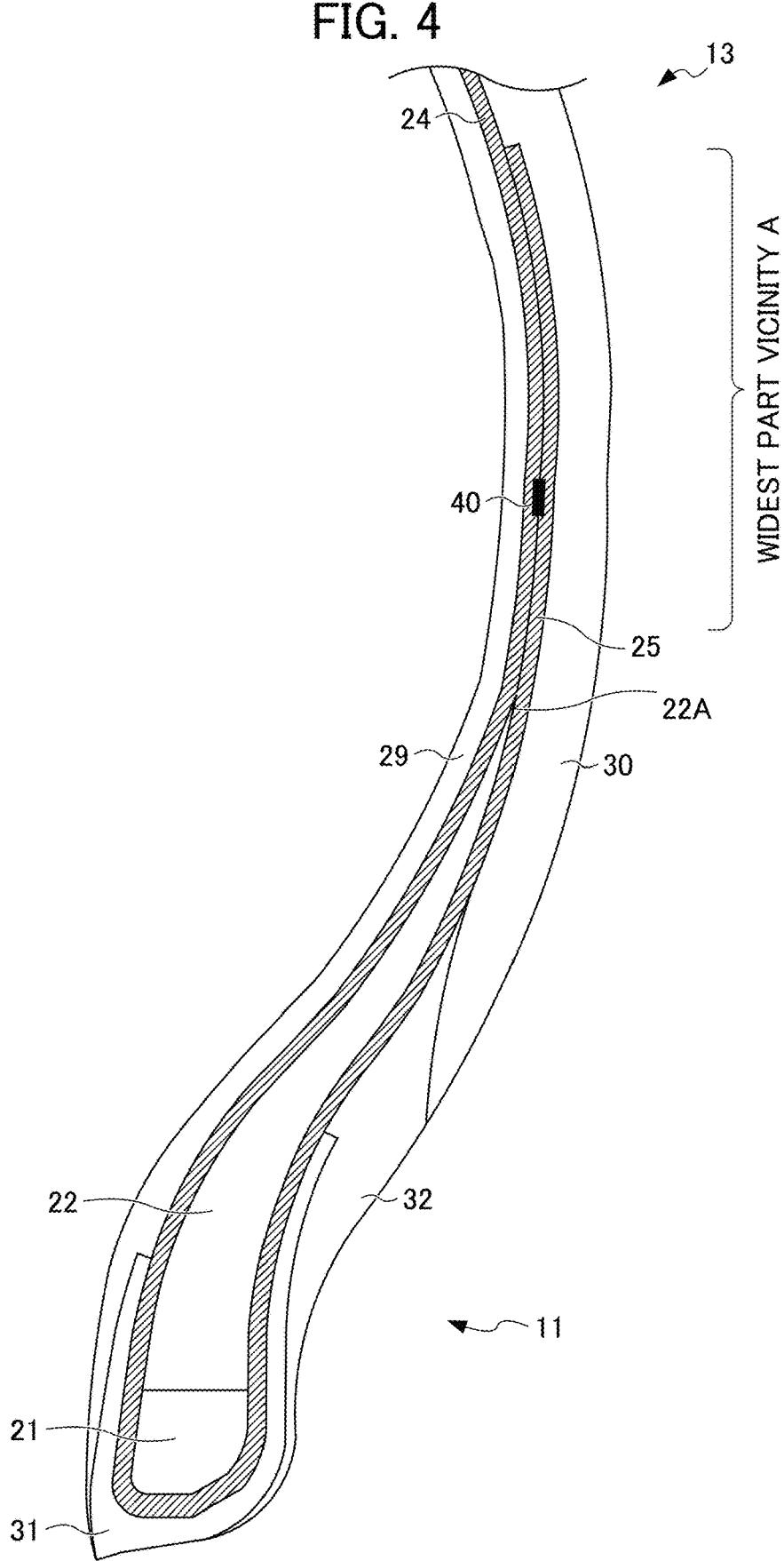
FIG. 4 is a partially enlarged cross-sectional view of a tire according to a modified example of the first embodiment of the present invention.

FIG. 3 is a view showing a half section in the tire-width direction of the tire 2 of a modified example of the present embodiment. FIG. 4 is an enlarged cross-sectional view showing around the embedded part of the RFID tag 40 in the tire 2 of FIG. 3. The RFID tag 40 may be arranged in the tire-widest part vicinity A of the side wall 13, as shown in the present modified example. Herein, tire-widest part refers to the widest position in the tire-width direction cross section, when assembling the tire to a normal rim, filling with normal internal pressure establishing an unloaded state not applying load.

Even in this case, the RFID tag 40 is arranged at a position far from the metal bead core 21, and also far from the steel belt 26; therefore, the RFID tag 40 will not be adversely affected by metal components.

According to the tire 1 of the present embodiment, the following effects are exerted.

(1) With the tire 1 according to the present embodiment, the RFID tag 40 is embedded in a region between the tire-radial direction outside end 22A of the bead filler 22 and the tire-width direction outside end 26A of the steel belt 26. Since it is thereby possible to arrange the RFID tag 40 at a position distanced from metal components such as the bead core 21, the performance of the communication function, etc. of the RFID tag 40 can be maintained.

(2) With the tire 1 according to the present embodiment, the RFID tag 40 is embedded in a region between the tire-radial direction outside end 22A of the bead filler 22 and the tire-width direction outside end 27A of the cap ply 27. It is thereby possible to reliably prevent the RFID tag 40 from contacting with the steel belt 26. Consequently, it is possible to keep the performance such as of the communication function of the RFID tag 40.

(3) With the tire 1 according to the present embodiment, the RFID tag 40 is embedded in a region between the tire-widest part vicinity A of the side wall 13 and the tire-radial direction outside end 22A of the bead filler 22. Since the RFID tag 40 is thereby arranged at a position far from the metal bead core 21, and also far from the steel belt 26, the possibility of the RFID tag 40 being adversely affected by metal components becomes very low.

(4) With the tire 1 according to the present embodiment, the RFID tag 40 is embedded in the tire-widest part vicinity A of the side wall 13. Since the RFID tag 40 is thereby arranged at a position far from the metal bead core 21, and also far from the steel belt 26, the possibility of the RFID tag 40 being adversely affected by metal components becomes very low.

(5) The tire 1 according to the present embodiment has a region in which the carcass ply 23 overlaps in the side wall 13, and the RFID tag 40 is arranged between the overlapped carcass ply 23. It is thereby possible to prevent stress concentration between the antenna of the RFID tag 40 and the side wall rubber 30 and/or inner liner 29 which are the rubber structure of the tire 1, during vulcanization and during use.

(6) With the tire 1 according to the present embodiment, the overlapped carcass ply 23 is configured from the ply body 24 extending from one bead core 21 to the other bead core 21, and the ply folding part 25 which is folded back around the bead core 21, and overlapped with the ply body 24. It is thereby possible to prevent stress concentration between the antenna of the RFID tag 40 and the side wall rubber 30 and/or inner liner 29 which are the rubber structure of the tire 1, during vulcanization and during use.

Second Embodiment

Next, a tire 3 according to a second embodiment will be explained while referencing FIGS. 5 and 6. It should be noted that the same reference symbol will be attached for the same configurations as the first embodiment in the following explanation, and detailed explanations thereof will be omitted.

Figure 5:
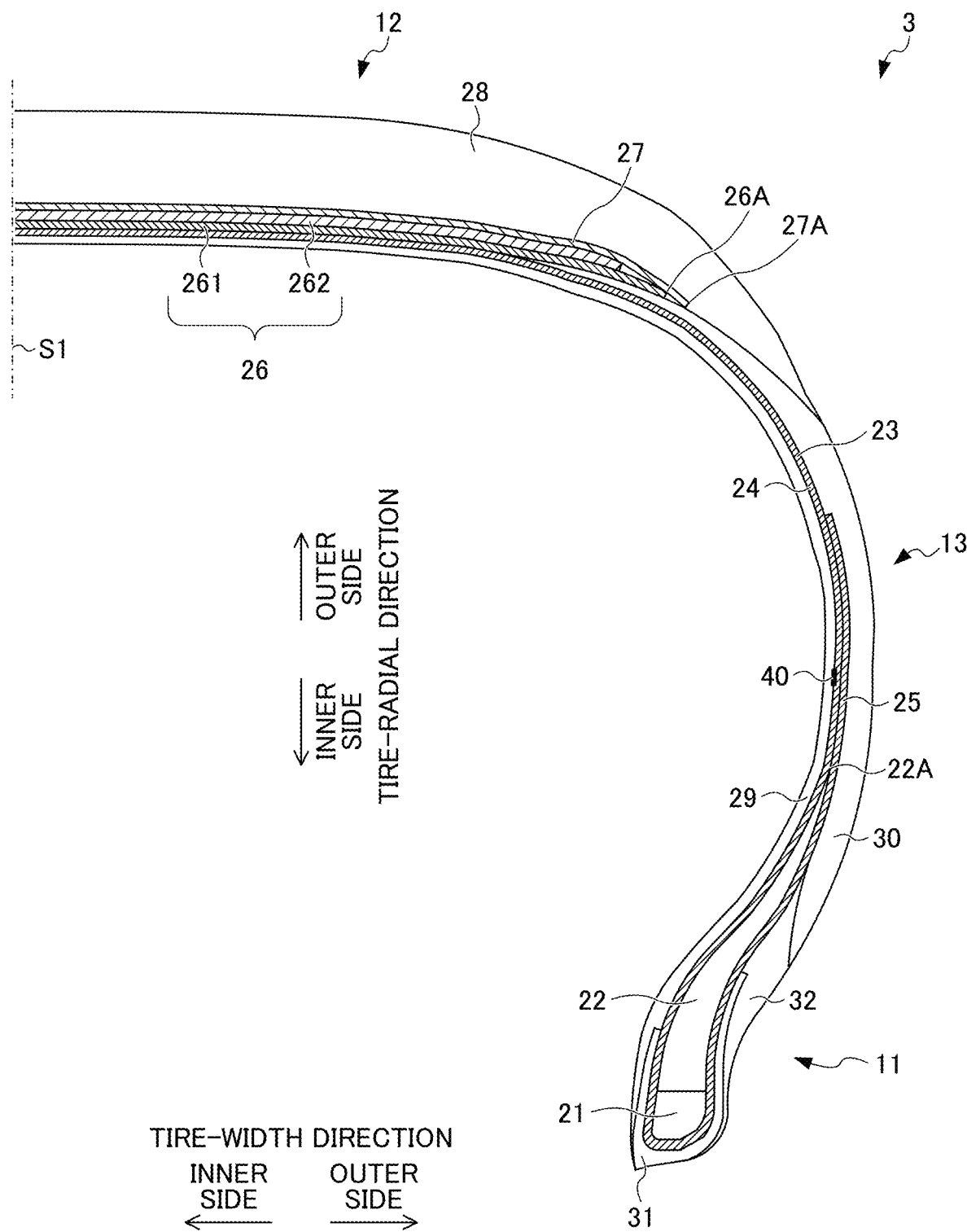
FIG. 5 is a view showing a half section in the tire-width direction of a tire according to a second embodiment of the present invention.

FIG. 5 is a view showing a half section in the tire-width direction of the tire 3 in the present embodiment. FIG. is an enlarged cross-sectional view showing around an embedded part of the RFID tag 40 in the tire 3 of FIG. 5. In the present embodiment, the RFID tag 40 serving as the electronic component is arranged between the carcass ply 23 and the inner liner 29. More specifically, it is arranged between the ply body 24 of the carcass ply 23 and the inner liner 29. Then, similarly to the first embodiment, the RFID tag 40 is embedded in a region between the tire-radial direction outside end 22A of the bead filler 22 and the tire-width direction outside end 26A of the steel belt 26. More specifically, the RFID tag 40 is embedded in a tire-widest part vicinity A of the side wall 13.

Even if such a configuration, since the RFID tag 40 can be arranged at a position sufficiently distanced from the metal bead core 21, which is a position not contacting the steel belt 26, it is possible to prevent deterioration in the communication state of the RFID tag 40.

In addition, according to the present embodiment, the RFID tag 40 is hardly affected by distortion of the tire, etc. while travelling, due to the movement being restricted by the fiber layer constituting the carcass ply 23. Consequently, it is possible to improve the durability of the RFID tag 40 by way of existing components, without using additional components. In addition, according to the present embodiment, the shock protection also improves. In other words, even if the tire receives external shock, since the distance from the outer wall surface of the tire 1 until the RFID tag 40 is far, and since the carcass ply 23 exists between the outer wall surface of the tire 1 and the RFID tag 40, the RFID tag 40 will be protected.

According to the tire 3 of the present embodiment, the following effects are exerted in addition to the above (1) to (4).

(7) In the present embodiment, the RFID tag 40 is arranged between the carcass ply 23 and the inner liner 29. Consequently, it is hardly affected by distortion of the tire, etc. while travelling, and thus it is possible to improve the durability of the RFID tag 40. In addition, since the distance from the outer wall surface of the tire 3 until the RFID tag 40 becomes far, it is possible to improve impact protection.

Third Embodiment

Next, a tire 4 according to a third embodiment will be explained while referencing FIGS. 7 and 8. It should be noted that the same reference symbol will be attached for the same configurations as the first embodiment in the following explanation, and detailed explanations thereof will be omitted.

Figure 7:
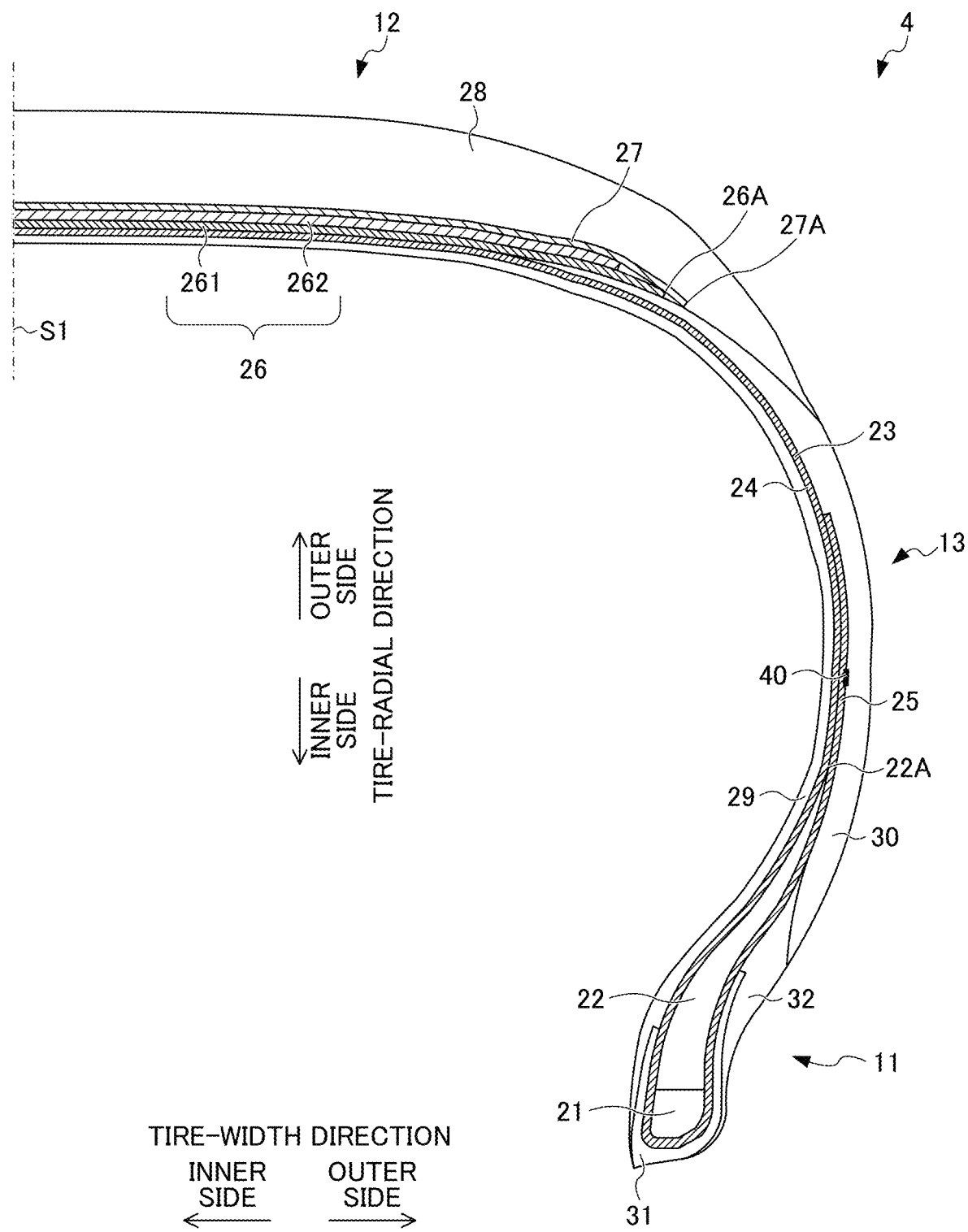
FIG. 7 is a view showing a half section in the tire-width direction of a tire according to a third embodiment of the present invention.

FIG. 7 is a view showing a half section in the tire-width direction of the tire 4 in the present embodiment. FIG. 8 is an enlarged cross-sectional view around an embedded part of the RFID tag 40 in the tire 4 of FIG. 7. In the present embodiment, the RFID tag 40 serving as an electronic component is arranged between the carcass ply 23 and the side wall rubber 30. More specifically, it is arranged between the ply folding part 25 of the carcass ply 23 and the side wall rubber 30. Then, similarly to the first embodiment, the RFID tag 40 is embedded in a region between the tire-radial direction outside end 22A of the bead filler 22 and the tire-width direction outside end 26A of the steel belt 26. More specifically, the RFID tag 40 is embedded in the tire-widest part vicinity A of the side wall 13.

Even if such a configuration, since the RFID tag 40 can be arranged at a position sufficiently distanced from the metal bead core 21, which is a position not contacting the steel belt 26, it is possible to prevent deterioration in the communication state of the RFID tag 40.

In addition, since the distance from the outer wall surface of the tire 4 until the RFID tag 40 becomes shorter, it is possible to achieve an improvement in communicability.

According to the tire 4 of the present embodiment, the following effects are exerted in addition to the above (1) to (4).

(8) In the present embodiment, the RFID tag 40 is arranged between the carcass ply 23 and the side wall rubber 30. Consequently, since the distance from the outer wall surface of the tire 4 until the RFID tag 40 becomes shorter, it is possible to achieve an improvement in communicability.

Fourth Embodiment

Next, a tire according to a fourth embodiment will be explained while referencing FIG. 9. It should be noted that the same reference symbol will be attached for the same configurations as the first to third embodiments in the following explanation, and detailed explanations thereof will be omitted.

Figure 9A:
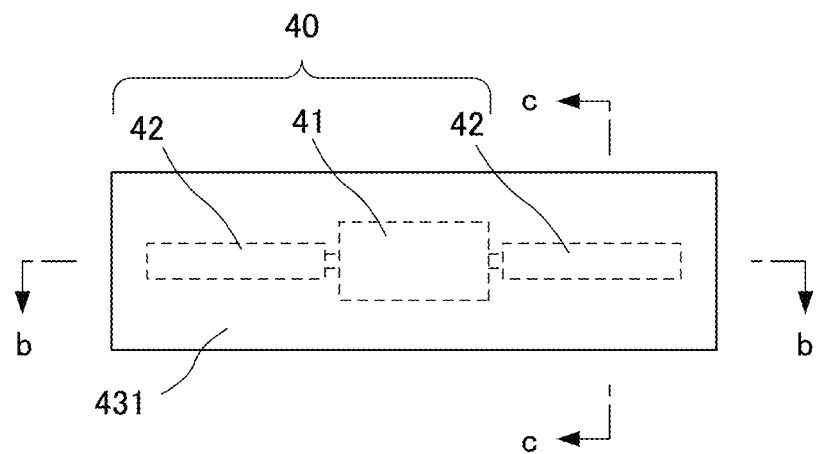
FIG. 9A is a view showing an RFID tag which is protected by a protective member in a tire according to a fourth embodiment of the present invention.
Figure 9B:
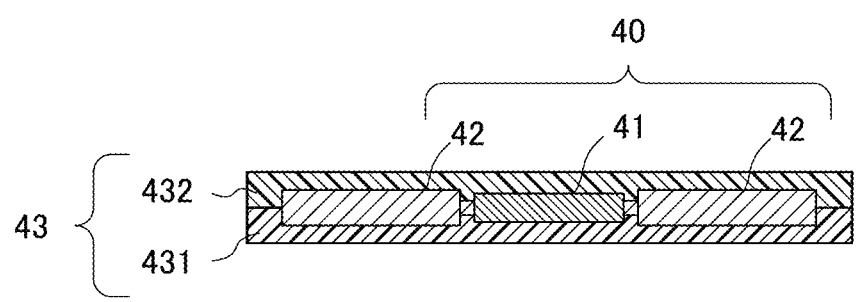
FIG. 9B is a view showing the b-b cross section in FIG. 9A.
Figure 9C:
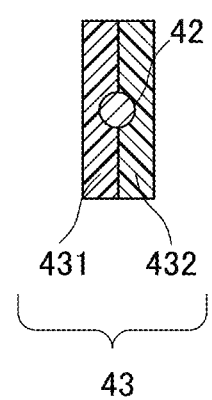
FIG. 9C is a view showing the c-c cross section in FIG. 9A.

FIG. 9A is a view showing the RFID tag 40 covered by the protective member 43 which is constituted from a rubber sheet. In FIG. 9A, the RFID tag 40 is covered by a rubber sheet 431 described later to be hidden. FIG. 9B is a cross-sectional view along the line b-b in FIG. 9A, and FIG. 9C is a cross-sectional view along the line c-c in FIG. 9A. In the present embodiment, the RFID tag 40 is covered by the protective member 43, as shown in FIG. 9. A configuration using the RFID tag 40 protected by the protective member 43 is also applicable to the tires of any embodiment among the first to third embodiments.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable.

The protective member 43 is configured from two rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, with the modulus of the side wall rubber 30 as a reference, it is preferable to use rubber of a modulus 1.1 to 2 times as the rubber used in the protective member 43. In addition, by using rubber having a higher modulus than the side wall rubber 30 or the inner liner 29 as the rubber adopted in the protective member 43, since the rigidity changes stepwise in the order of RFID tag 40, protective member 43 side wall rubber 30 or inner liner 29 in the embodiments shown in FIGS. 5 to 8, for example, it is possible to prevent excessive stress from generating within the rubber structure at the embedded part of the RFID tag 40, in the case of the tire deforming.

Figure 8:
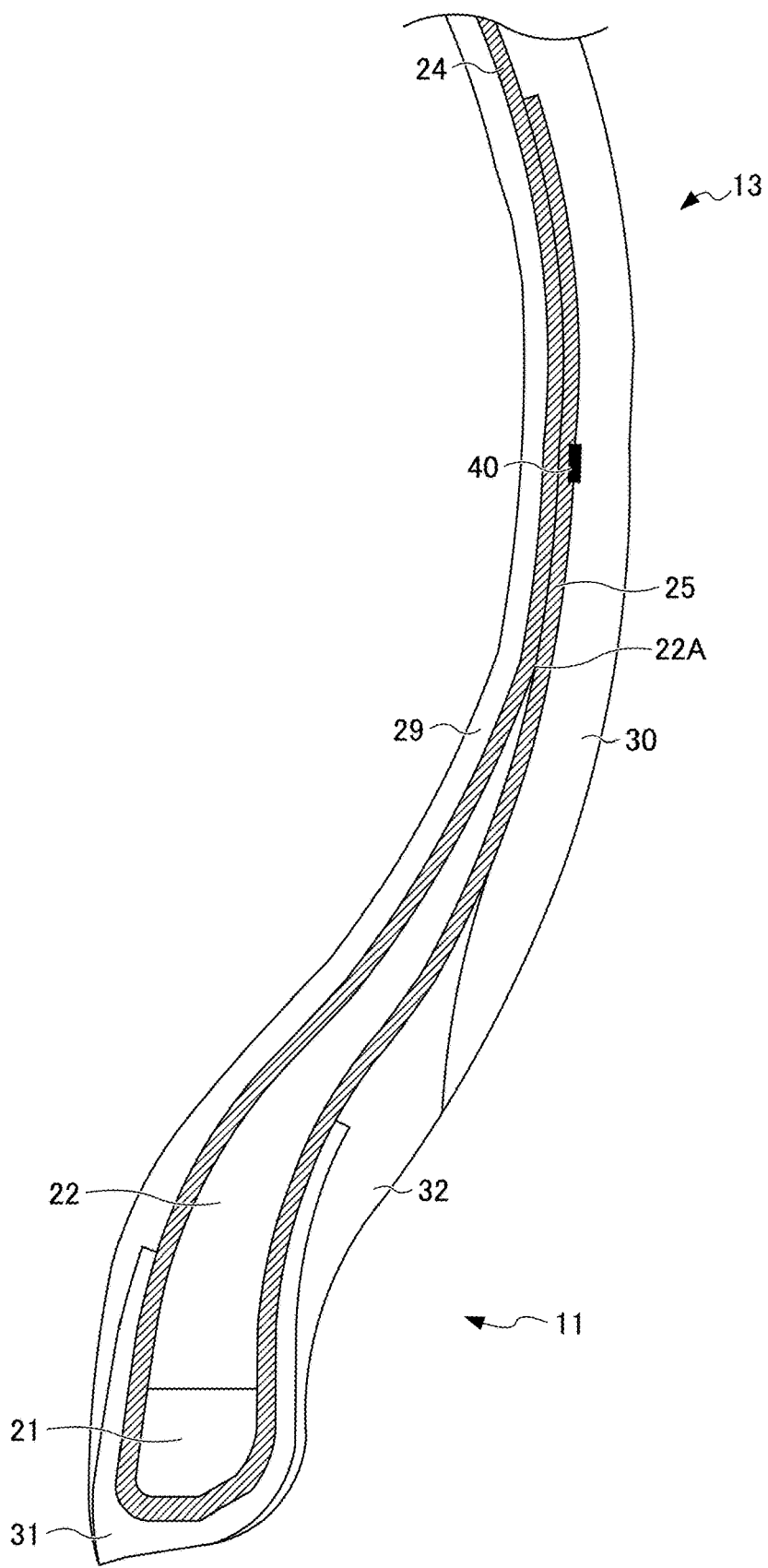
FIG. 8 is a partially enlarged cross-sectional view of the tire according to the third embodiment of the present invention.

It should be noted that, in the third embodiment shown in FIGS. 7 and 8, the RFID tag 40 is arranged in a region between the side wall rubber 30 and carcass ply 23, when viewing in the tire-width direction. Therefore, the modulus of the protective member 43 may be set to a value higher than the modulus of the side wall rubber 30 and lower than the modulus of the coating rubber of the carcass ply 23. In the case of the modulus within the tire coming to change stepwise, and the tire deforming, it is thereby possible to prevent excessive stress from generated within the rubber structure at the embedded part of the RFID tag 40. In other words, it is possible to suppress the generation of stress.

Figure 6:
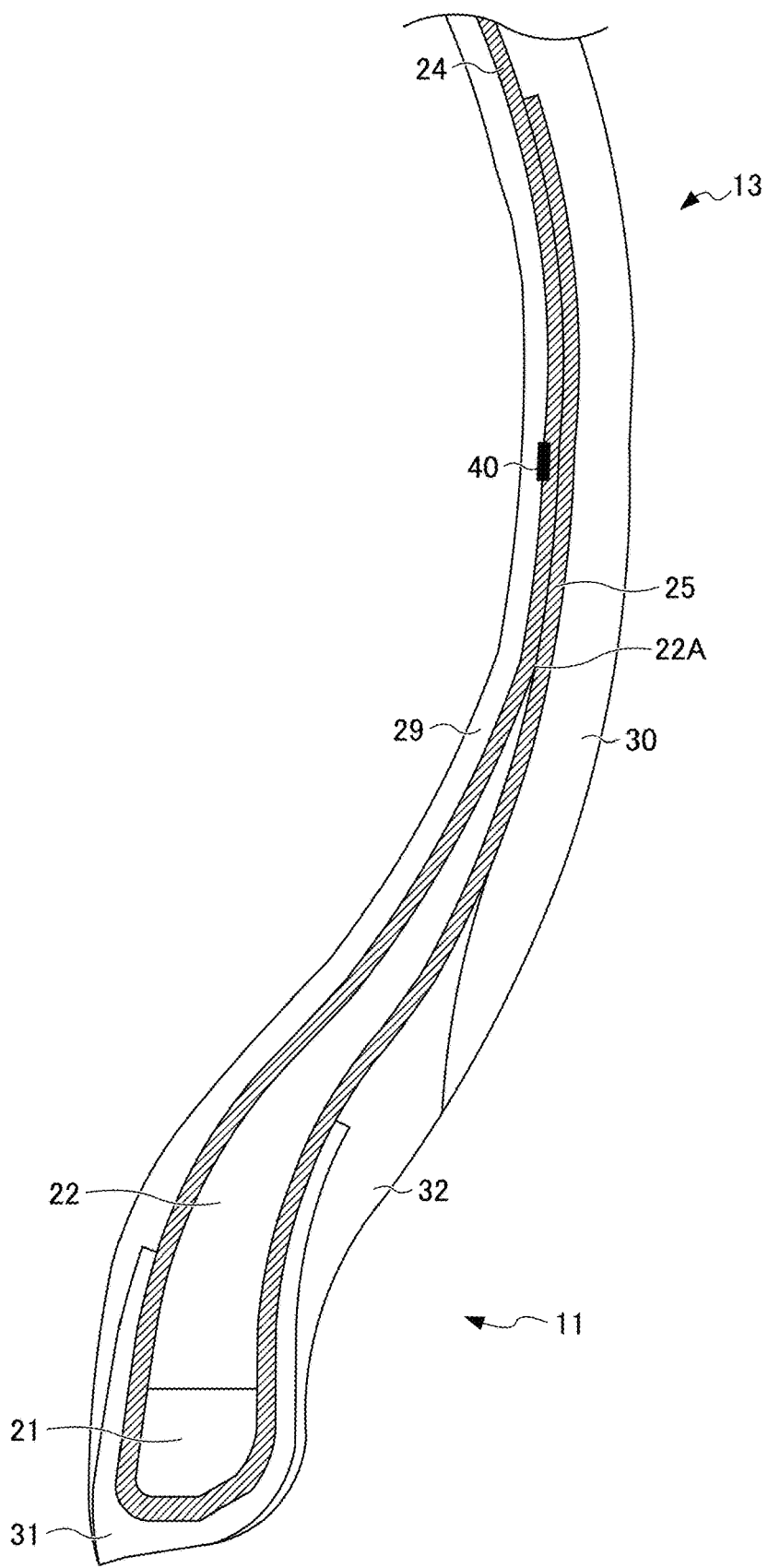
FIG. 6 is a partially enlarged cross-sectional view of the tire according to the second embodiment of the present invention.

It should be noted that, in the second embodiment shown in FIGS. 5 and 6, the RFID tag 40 is arranged in a region between the inner liner 29 and the carcass ply 23, when viewing in the tire-width direction. Therefore, the modulus of the protective member 43 may be set to a value higher than the modulus of the inner liner 29, and lower than the modulus of the coating rubber of the carcass ply 23. In the case of the modulus within the tire coming to change stepwise, and the tire deforming, it is thereby possible to prevent excessive stress from generated within the rubber structure at the embedded part of the RFID tag 40. In other words, it is possible to suppress the generation of stress. At this time, the modulus of the inner liner 29 may be a modulus on the same order as the modulus of the side wall rubber 30.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40. In addition, as the protective member 43, an organic fiber layer from polyester fibers or polyamide fibers may be provided. It is also possible to embed an organic fiber layer in the two rubber sheets 431, 432.

In this way, if configuring the protective member 43 by two rubber sheets, since it is possible to thinly form the RFID tag 40 including the protective member 43, it is favorable upon embedding in the tires 1 to 3. In addition, when assembling the RFID tag 40 in the constitutional members of the tires 1 to 3 prior to vulcanization, the RFID tag 40 covered by the rubber sheets can be installed very easily. For example, at a desired position of a member such as the carcass ply 23, inner liner 29 and side wall rubber 30 prior to vulcanization, it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

However, the protective member 43 is not limited to the form configured by two rubber sheets, and can adopt various forms. For example, at least one rubber sheet constituting the protective member, so long as covering at least part of the RFID tag 40, can obtain effects such as an improvement in workability in the manufacturing process and stress mitigation. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if such a configuration, it will be possible to appropriately protect the RFID tag 40.

For example, in the first embodiment, in a case of adopting the configuration protecting the RFID tag 40 by the protective member 43, the RFID tag 40 comes to be sandwiched between the ply body 24 and the ply folding part 25 in a state covered by the protective member 43. In this case, by the existence of the protective member 43, the RFID tag 40 is protected even under the situation of the RFID tag 40 receiving stress from the ply body 24 and ply folding part 25 moving relatively. Consequently, the durability of the RFID tag 40 further improves. It should be noted that the tire-widest part vicinity A is a portion which relatively greatly bends during tire deformation. As shown in the present embodiment, by protecting the RFID tag 40 by way of the protective member 43, it is possible to raise the durability of the RFID tag 40, even in a case of embedding the RFID tag 40 in such a portion.

In addition, as previously mentioned, in the second and third embodiment, it is also possible to adopt a configuration embedding the RFID tag 40 protected by the protective member 43 in the tire. Also in this case, the durability of the RFID tag 40 improves.

In addition, by providing the protective member 43, it becomes possible to prevent the antenna 42 of the RFID tag 40 from directly pushing the side wall rubber 30 or inner liner which are the rubber structure of the tire, during vulcanization or during usage. It should be noted that, from the viewpoint of enhanced protection, the RFID tag covered by the rubber sheet in the vulcanized state may be attached to a constituent member of the tire prior to vulcanization, e.g., carcass ply 23.

It should be noted that the protective member 43 may be provided only to one side of the RFID tag 40. For example, if considering the prevention of the antenna 42 of the RFID tag 40 directly pushing the inner line 29 or side wall rubber 30 which are the rubber structure of the tire, a rubber sheet and/or fiber layer may be provided as the protective member only to the inner side in the tire-width direction of the RFID tag 40, i.e. side of the inner liner 29, in the second embodiment. In addition, in the third embodiment, a rubber sheet and/or fiber layer may be provided as the protective member only to the outer side in the tire-width direction of the RFID tag 40, i.e. side of the side wall. On the other hand, if considering the matter of preventing stress concentration between the carcass ply 23 and the RFID tag 40 according to the difference in expansion/contraction amount between constituent members of the tire during manufacture such as the vulcanization process, and the matter of preventing stress concentration between the carcass ply 23 and the RFID tag 40 which generates due to distortion of the tire during use, for example, a rubber sheet and/or fiber layer may be provided as the protective member only to the outer side in the tire-width direction of the RFID tag 40, i.e. side of the carcass ply 23, in the second embodiment. In addition, a rubber sheet and/or fiber layer may be provided as the protective member only to the inner side in the tire-width direction of the RFID tag 40, i.e. side of the carcass ply 23, in the third embodiment. In addition, according to the difference in expansion/contraction amount between constituent members of the tire, a rubber sheet and/or fiber layer may be provided as the protective member only to the outer side in the tire-width direction of the RFID tag 40, or only to the inner side in the tire-width direction, in the first embodiment, for example. In the case of providing the protective member 43 only to one side of the RFID tag 40, it is possible to make the overall thickness thin.

It should be noted that the RFID tag 40 covered by the protective member 43 is embedded in the tire so that the longitudinal direction thereof becomes the direction of the tangential line relative to the circumferential direction of the tire, i.e. direction orthogonal to the paper plane in the cross-sectional view of FIGS. 1 to 8. In addition, the rubber sheets 431, 432 are embedded in the tire in a form such that aligns in the tire-width direction. In other words, in the manufacturing process, one surface of either one of the rubber sheets 431, 432 is pasted to a constituent member of the tire prior to vulcanization, e.g., the carcass ply 23. By establishing such a form, stress will hardly act on the RFID tag 40, even when the tire deforms. In addition, in the manufacturing process, the work of attaching the RFID tag 40 covered by the protective member 43 becomes easy.

According to the tire of the present embodiment, the following effects are exerted in addition to the above (1) to (8).

(9) In the present embodiment, the rubber sheets 431, 432 which cover at least part of the RFID tag 40 are provided in the vicinity of the RFID tag 40. For example, the tire-widest part vicinity is a portion which relatively greatly bends during tire distortion; however, even in a case of arranging the RFID tag 40 at such a portion, it is possible to appropriately protect the RFID tag 40. In addition, the workability in the manufacturing process improves.

(10) In the present embodiment, the rubber sheets 431, 432 are configured from rubber of higher modulus than the side wall rubber 30, or short-fiber filler mixed rubber. Consequently, the RFID tag can be appropriately protected.

(11) In the present embodiment, the rubber sheets 431, 432 are configured from rubber of a modulus higher than the side wall rubber 30 or inner liner 29, and lower than the coating rubber of the carcass ply 23. Consequently, due to the modulus within the tire changing stepwise, it is possible to prevent excessive stress from generating within the rubber structure at the embedded part of the RFID tag 40, in the case of the tire deforming.

Fifth Embodiment

Figure 10A:
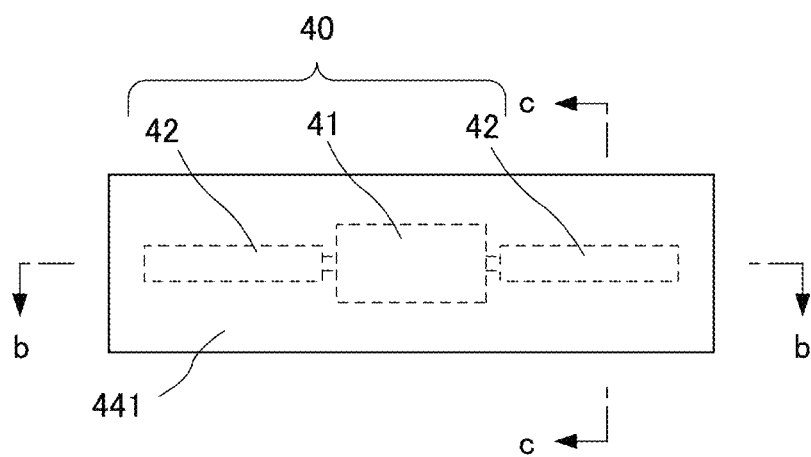
FIG. 10A is a view showing an RFID tag protected by a protective member in a tire according to a fifth embodiment of the present invention.
Figure 10B:
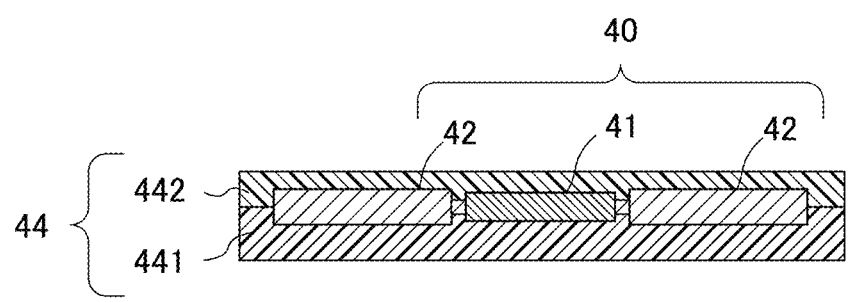
FIG. 10B is a view showing the b-b cross section in FIG. 10A.
Figure 10C:
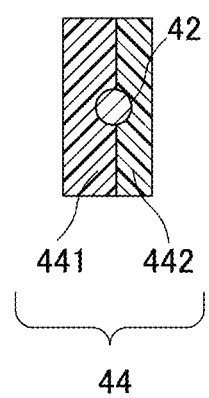
FIG. 10C is a view showing the c-c cross section in FIG. 10A.

Next, a tire according to a fifth embodiment will be explained while referencing FIG. 10. It should be noted that the same reference symbol will be attached for the same configurations as the second and fourth embodiments in the following explanation, and detailed explanations thereof will be omitted. FIG. 10A is a view showing the RFID tag 40 protected by a protective member 44. In FIG. 10A, the RFID tag 40 is covered by a rubber sheet 441 described later and is hidden. FIG. 10B is a cross-sectional view along the line b-b in FIG. 10A, and FIG. 10C is a cross-sectional view along the line c-c in FIG. 10A.

In the present embodiment, similarly to the second embodiment shown in FIGS. 5 and 6, the RFID tag 40 serving as the electronic component is arranged between the carcass ply 23 and the inner liner 29. Then, the RFID tag 40 is covered by a protective member configured from two rubber sheets, similarly to the fourth embodiment. However, in the present embodiment, the thicknesses of the two rubber sheets constituting the protective member 44 are different. More similarly, the rubber sheet 441 on the tire inner cavity side, i.e. side of the inner liner 29, is formed thicker than the rubber sheet 442 on the tire outer surface side, i.e. side of the carcass ply 23.

Since the side of the inner liner 29 is thereby more strongly protected, it is possible to protect the antenna 42 of the RFID tag 40 from strongly pushing the inner liner 29 during vulcanization and during use.

It should be noted that, although the thickness of the rubber sheet 441 on the side of the inner liner 29 is formed thickly in order to more strongly protect the side of the inner liner 29, it is also possible to adopt another configuration for more strongly protecting the side of the inner liner 29.

For example, the modulus of the rubber sheet 441 on the side of the inner liner 29 may be set to a modulus higher than the modulus of the rubber sheet 442 on the side of the carcass ply 23. In this case, if considering the absorption of stress during tire distortion, it is preferable for the relationship of magnitudes of the modulus of each member to be in the order of "rubber sheet 441">"rubber sheet 442">"side wall rubber 30".

In addition, the rubber sheet 441 may be constituted by short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the rubber sheet 441, a rubber sheet in the vulcanized state may be used. The rubber sheet in a vulcanized state does not plastically deform as does raw rubber, and thus can appropriately protect the RFID tag 40. In addition, an organic fiber layer such as of polyester fiber or polyamide fiber may be provided to the rubber sheet 441. In these cases, it is also possible to establish the thicknesses of the rubber sheets 441 and 442 as the same thickness.

According to these configurations, since the side of the inner liner 29 is more strongly protected, it is possible to prevent the antenna 42 of the RFID tag 40 from strongly pushing the inner liner 29 during vulcanization and during use.

According to the tire of the present embodiment, the following effects are exerted in addition to the above (1) to (4), (7), and (9) to (11).

(12) In the present embodiment, regarding the rubber sheets constituting the protective member 44, the rubber sheet 441 on the inner side in the tire-width direction, i.e. side of the inner liner 29, is formed thicker than the rubber sheet 442 on the outer side in the tire-width direction, i.e. side of the carcass ply 23. Since the side of the inner liner 29 is thereby more strongly protected, it is possible to protect the antenna 42 of the RFID tag 40 from strongly pushing the inner liner 29 during vulcanization and during use.

Sixth Embodiment

Figure 11:
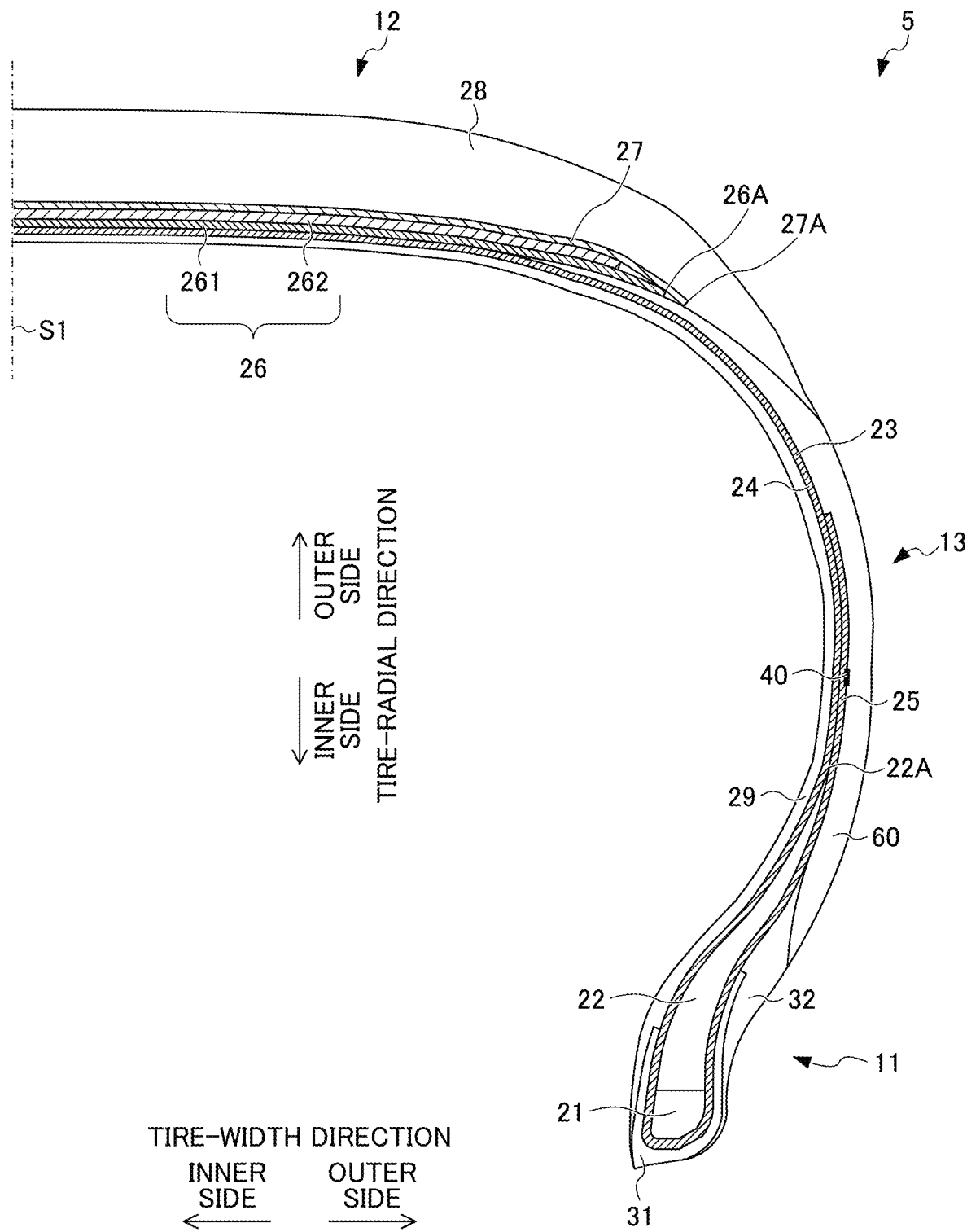
FIG. 11 is a view showing a half section in the tire-width direction of a tire according to a sixth embodiment.

Next, a tire 5 according to a sixth embodiment will be explained while referencing FIG. 11. It should be noted that the same reference symbol will be attached for the same configurations as the third embodiment in the following explanation, and detailed explanations thereof will be omitted.

In the present embodiment, side wall rubber 60 plays a function as a protective member. More specifically, in the present embodiment, similarly to the third embodiment shown in FIGS. 7 and 8, the RFID tag 40 serving as the electronic component is arranged between the carcass ply 23 and the side wall rubber 60. Then, in the present embodiment, rubber of a modulus higher than the inner liner 29 is used as the side wall rubber 60. It is thereby possible for the side wall rubber 60 to function as a protective member of the RFID tag 40, and protect the RFID tag 40. Consequently, it is possible to protect the RFID tag 40 by a simple configuration, without increasing the number of members.

According to the tire 5 of the present embodiment, the following effects are exerted in addition to the above (1) to (4) and (8).

(13) In the present embodiment, the RFID tag 40 is arranged between the carcass ply 23 and the side wall rubber 60, and the side wall rubber 60 of higher modulus than the inner liner 29 functions as a protective member of the RFID tag 40. Consequently, it is possible to protect the RFID tag by way a simple configuration, without increasing the number of components.

It should be noted that, although the tire of the present invention can be adopted as various types of tires such as for cars, light trucks, trucks and buses, it is particularly suitable as a tire for passenger cars. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire comprising:
tread having at least one ring-shaped steel belt which extends in a circumferential direction of the tire;
a pair of beads each having a bead filler which extends to an outer side in a tire-radial direction of a bead core;
a carcass ply comprising a ply body which is at least one layer extending from one bead core to another bead core, and a ply folding part that is folded back around the one bead core to the outer side in a tire-radial direction of the one bead core and overlapped with the ply body;
an inner liner provided to an inner side in the tire-width direction of the carcass ply;
side wall rubber provided to an outer side in the tire-width direction of the carcass ply; and
rim strip rubber with an outer side in the tire-width direction that connects with the side wall rubber,
wherein an electronic component having at least part thereof covered by a rubber sheet is embedded in a region between a tire-radial direction outside end of the bead filler and a tire-width direction outside end of the steel belt, wherein a radially outer end of the rim strip rubber is at a radial position that is radially below and spaced apart from a radially inner end of the electronic component,
wherein the electronic component, with at least part thereof covered by a rubber sheet, is completely sandwiched between the carcass ply body and the inner liner, and the rubber sheet is formed from rubber with a modulus twice that of the inner liner, and lower than that of a coating rubber of the carcass ply, thereby establishing a stepwise increase in modulus within the tire, following a sequence from the inner liner, through the rubber sheet, to the coating rubber of the carcass ply, wherein a tire-widest part vicinity is an area of the side wall rubber having a range of 20% of a cross-sectional height centered at a widest position in the tire-width direction in a cross section view of the tire, wherein a radially outer end of the tire-widest part vicinity is positioned 10% of the cross-sectional height from the widest position to an outer side in the tire-radial direction and a radially lower end of the tire-widest part vicinity is positioned 10% of the cross-sectional height from the widest position to an inner side of the tire-radial direction, wherein a ply folding end of the carcass ply is located at the same radial position as the radially outer end of the tire-widest part vicinity.

2. The tire according to claim 1, further comprising a cap ply at an outer side in the tire-radial direction of the steel belt, wherein a tire-width direction outside end of the cap ply extends more to an outer side in the tire-width direction than the tire-width direction outside end of the steel belt, and wherein the electronic component is embedded in a region between the tire-radial direction outside end of the bead filler and the tire-width direction outside end of the cap ply.

3. The tire according to claim 1, wherein the side wall rubber extends between the bead and the tread, wherein the electronic component is embedded in a region between a tire-widest part vicinity of the side wall rubber and the tire-radial direction outside end of the bead filler.

4. The tire according to claim 3, wherein the electronic component is embedded in the tire-widest part vicinity of the side wall rubber.

5. The tire according to claim 1, wherein the rubber sheet is configured from a short-fiber filler mixed rubber.

6. The tire according to claim 1, wherein the electronic component is located on an inner side in the tire-radial direction of the tire-widest position.

7. The tire according to claim 1, wherein a distance between the ply folding end of the carcass ply and the electronic component is within the range of greater than 10% to less than 20% of the cross-sectional height.

* * * * *